United States Patent
Chung et al.

(10) Patent No.: US 8,120,337 B2
(45) Date of Patent: Feb. 21, 2012

(54) INVERTER DRIVER AND LOAD DRIVER INCLUDING THE SAME, AND DRIVING METHOD THEREOF

(75) Inventors: Jin-Hwa Chung, Seoul (KR); Jae-Soon Choi, Kangki-do (KR); Chan Son, Seoul (KR); Hak-Hee Lee, Kangki-do (KR)

(73) Assignee: Fairchild Korea Semiconductor Ltd., Bucheon (KR)

( * ) Notice: Subject to any disclaimer, the term of this patent is extended or adjusted under 35 U.S.C. 154(b) by 16 days.

(21) Appl. No.: 12/564,632

(22) Filed: Sep. 22, 2009

(65) Prior Publication Data

US 2010/0079176 A1 Apr. 1, 2010

(30) Foreign Application Priority Data

Sep. 26, 2008 (KR) .................... 10-2008-0094949

(51) Int. Cl.
*G05F 1/00* (2006.01)

(52) U.S. Cl. .................................................. 323/271

(58) Field of Classification Search .................. None
See application file for complete search history.

(56) References Cited

U.S. PATENT DOCUMENTS

| | | | |
|---|---|---|---|
| 5,481,178 A * | 1/1996 | Wilcox et al. | 323/287 |
| 6,229,366 B1 | 5/2001 | Balakirshnan et al. | |
| 2005/0007794 A1 * | 1/2005 | Fukumoto | 363/16 |
| 2009/0066265 A1 * | 3/2009 | Imanaka et al. | 315/307 |

FOREIGN PATENT DOCUMENTS

KR 1020040076100 A 8/2004

* cited by examiner

*Primary Examiner* — Lincoln Donovan
*Assistant Examiner* — Khareem E Almo
(74) *Attorney, Agent, or Firm* — Okamoto & Benedicto LLP

(57) ABSTRACT

A load driver includes an inverter and an inverter driver. The inverter converts an input voltage into a driving voltage of a discharge lamp using at least one first switch for switching according to a duty ratio, and the inverter driver controls the inverter. The inverter driver controls the duty ratio using a voltage of a capacitor and a control signal having a waveform that is repeated with a predetermined frequency. The capacitor is charged and discharged by a current corresponding to a difference between a feedback voltage corresponding to a current flow to the discharge lamp and a reference voltage. Such inverter driver controls to gradually increase the output voltage of the inverter in the soft start period by setting the voltage of the capacitor as a voltage corresponding to the control signal.

20 Claims, 6 Drawing Sheets

INVERTER DRIVER AND LOAD DRIVER INCLUDING THE SAME, AND DRIVING METHOD THEREOF

CROSS-REFERENCE TO RELATED APPLICATION

This application claims priority to and the benefit of Korean Patent Application No. 10-2008-0094949 filed in the Korean Intellectual Property Office on Sep. 26, 2008, the entire contents of which are incorporated herein by reference.

BACKGROUND OF THE INVENTION (a) Field of the Invention

The present invention relates to an inverter driver and a load driver including the same, and a driving method thereof.

(b) Description of the Related Art

An inverter generates a driving voltage for driving a discharge lamp and supplies the driving voltage to the discharge lamp. Further, the inverter controls the brightness of the discharge lamp by controlling a current thereof. The inverter is controlled by an inverter driver.

The discharge lamp needs a high voltage when it is initially turned on. However, the high voltage has a large influence on the life of the discharge lamp. Thus, the discharge lamp needs soft starting method to gradually increase the output voltage of the inverter for extending the life of the discharge lamp when it is initially turned on.

A soft starting method using a capacitor or a starting method using a digital-analog converter is used as the soft starting method. In order to implement the soft starting method using a capacitor in the inverter driver, a separate output pin should be added to the inverter driver. Further, the digital-analog converter has a complex structure because the size of the digital-analog converter is large and the number of circuit elements is high. Accordingly, when the starting method using the digital-analog converter is implemented in the inverter driver, an area of a soft start block is increased in the inverter driver and the size of the inverter driver is increased. Thus, the cost of the inverter driver is increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide an inverter driver and a load driver including the same, and a driving method thereof, having advantages of implementing a simple soft start function.

An exemplary embodiment of the present invention includes a load driver for driving a discharge lamp, including an inverter, a capacitor, and an inverter driver. The inverter converts an input voltage into a driving voltage of the discharge lamp using at least one first switch for switching according to a duty ratio. The capacitor is charged and discharged by a current corresponding to a difference between a feedback voltage corresponding to a current flow to the discharge lamp and a reference voltage. The inverter driver controls the duty ratio using a first control signal having a waveform that is repeated with a first frequency and a voltage of the capacitor, and sets the voltage of the capacitor to correspond to the first control signal during a soft start period.

Another exemplary embodiment of the present invention includes an inverter driver configured to drive an inverter to supply driving voltages to a load using at least one first switch for switching according to a duty ratio. The inverter driver includes a first terminal, an amplifier, a first comparator, a second comparator, and a soft start unit. The first terminal is connected to a capacitor. An amplifier outputs a current corresponding to a difference between a feedback voltage corresponding to a current flow to the load and a reference voltage, to the capacitor. The first comparator outputs a first pulse signal according to a comparison of a voltage of a first control signal having a waveform that is repeated with a first frequency and a voltage of a second control signal controlled from the outside. The second comparator outputs a second pulse signal according to a comparison of a voltage of a third control signal having a waveform that is repeated with a second frequency and the voltage of the capacitor. The soft start unit sets the voltage of the capacitor as the first control signal during a soft start period. At this time, the duty ratio of the at least one first switch is determined by the first and second pulse signals.

Still another exemplary embodiment of the present invention provides a method of driving a load using a switching device for switching according to a duty ratio and a capacitor. According to the method, a first control signal having a waveform that is repeated with a first frequency is generated, a second control signal having a waveform that is repeated with a second frequency is generated, a first pulse signal is generated using a voltage of the capacitor and a voltage of the second control signal, a second pulse signal is generated using the first control signal, a duty ratio is determined according to the first and second pulse signals, the voltage of the capacitor is set as a voltage corresponding to the first control signal during a soft start period, and the capacitor is charged and discharged using a voltage that is determined by a current corresponding to a difference between a feedback voltage corresponding to a current flow to the load and a reference voltage during a normal driving period after the soft start period.

An inverter driver according to an exemplary embodiment of the present invention implements a soft start function using a control signal used to control the brightness of the discharge lamp. Thus, the soft start function may be implemented simply in the inverter driver.

DETAILED DESCRIPTION OF THE EMBODIMENTS

Figure 1:
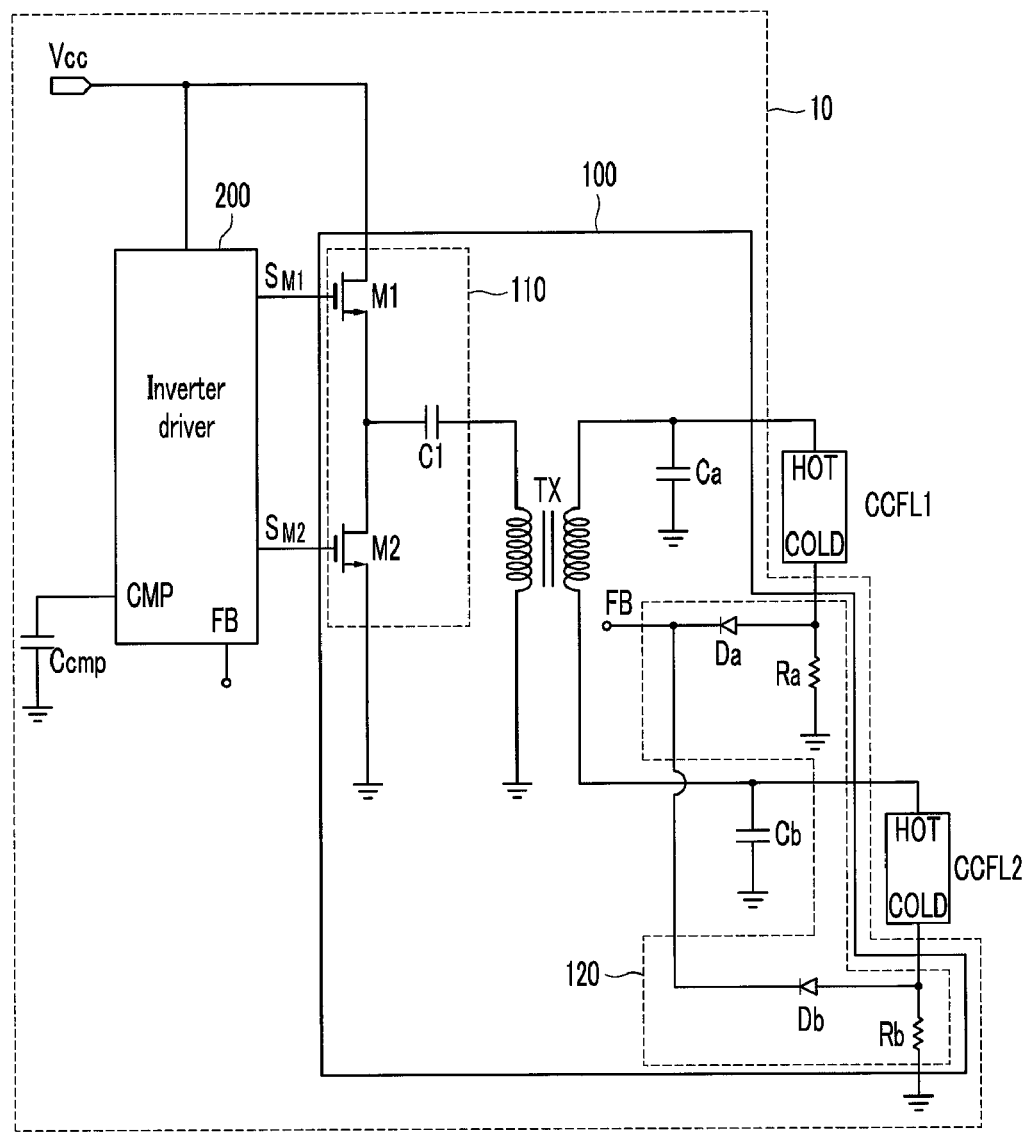
FIG. 1 is a drawing showing a load driver according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout this specification and the claims that follow, when it is described that an element is "coupled" to another element, the element may be "directly coupled" to the other element or "electrically coupled" to the other element through a third element. In addition, unless explicitly described to the contrary, the word "comprise" and variations such as "comprises" or "comprising", will be understood to imply the inclusion of stated elements but not the exclusion of any other elements.

Hereinafter, an inverter driver and load driver including the same, and a driving method thereof according to an exemplary embodiment of the present invention will be described in detail.

Figure 2:
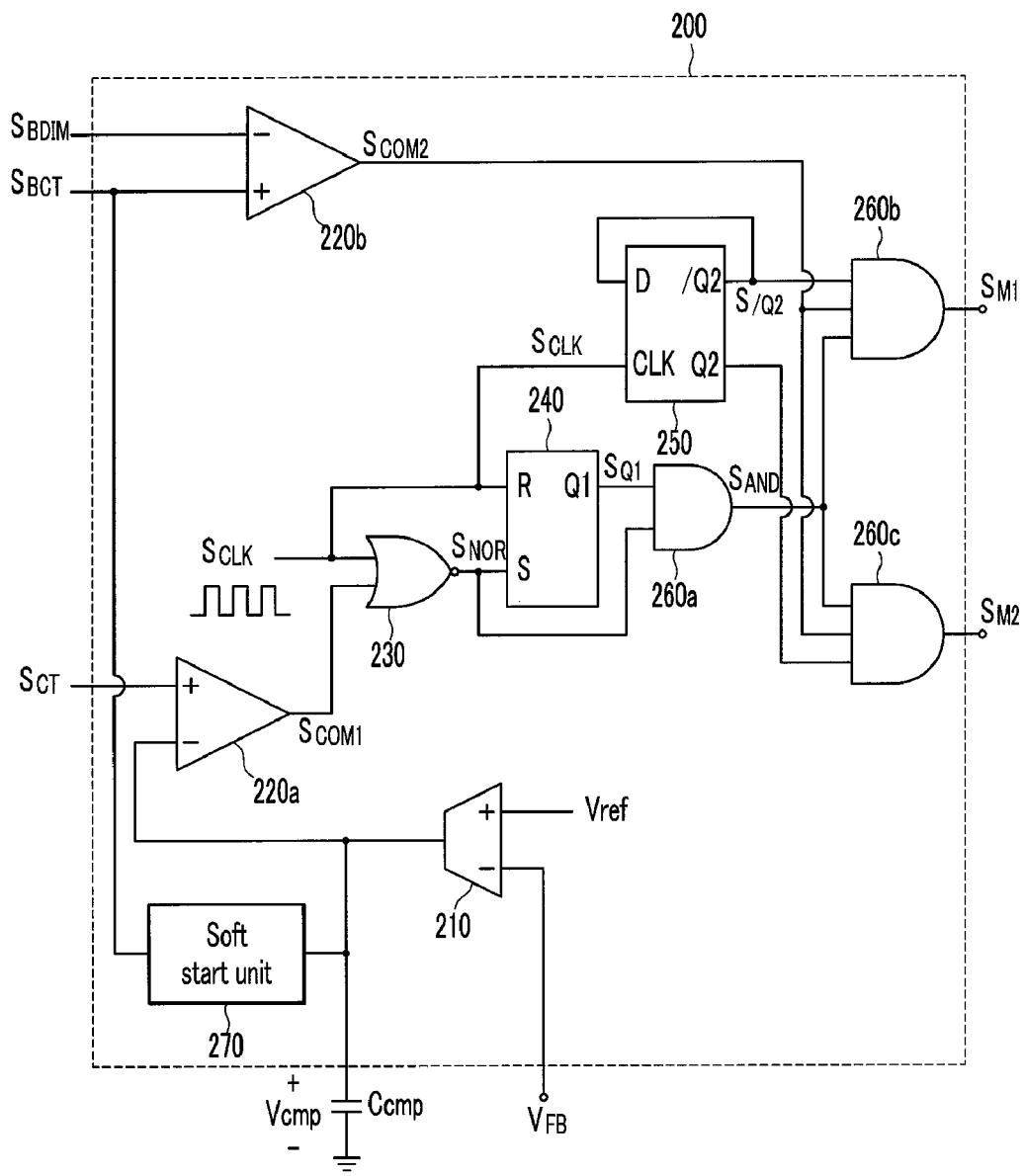
FIG. 2 is a drawing showing an inverter driver shown in FIG. 1.

FIG. 1 is drawing showing a load driver according to an exemplary embodiment of the present invention, and FIG. 2 is drawing showing an inverter driver shown in FIG. 1.

As shown in FIG. 1, a load driver 10 for driving discharge lamps CCFL1 and CCFL2 includes an inverter 100, an inverter driver 200, and a capacitor Ccmp.

The inverter 100 includes a switching circuit unit 110, a transformer TX, capacitors Ca and Cb, and a feedback supply unit 120.

The switching circuit unit 110 includes transistors M1 and M2, and a capacitor C1. In FIG. 1, the transistors M1 and M2 is illustrated as an n-channel field effect transistors, particularly n-channel metal oxide semiconductor (NMOS) transistors. However, other switches that can perform a similar function may be used for the transistors M1 and M2.

A gate of each of the transistors M1 and M2 that is turned on or turned off according to a control signal $S_{M1}$ and $S_{M2}$ outputted from the inverter driver 200 is connected to the inverter driver 200. A drain of the transistor M1 is connected to a power source supplying a DC voltage Vcc, a source of the transistor M1 is connected to a drain of the transistor M2, and a source of the transistor M2 is connected to a ground source. A first terminal of the capacitor C1 is connected to a node between the transistors M1 and M2, and a second terminal of the capacitor C1 is connected to a first terminal of the primary coil of the transformer TX1.

Such switching circuit unit 110 receives the DC voltage Vcc, and generates a square wave voltage by an operation for turning on and turning off the transistors M1 and M2. More specifically, when the transistor M1 is turned on and the transistor M2 is turned off in response to the control signals $S_{M1}$ and $S_{M2}$ outputted from the inverter driver 200, the DC voltage Vcc is charged in the capacitor C1. Next, when the transistor M1 is turned off and the transistor M2 is turned on in response to the control signals $S_{M1}$ and $S_{M2}$ outputted from the inverter driver 200, a voltage of the capacitor C1 can become 0V. In this way, the square wave voltage may be generated according to the transistors M1 and M2 that are repeatedly turned on and turned off in response to the control signal $S_{M1}$ and $S_{M2}$ outputted from the inverter driver 200.

The transformer TX includes a primary coil, and a secondary coil. A first terminal of the primary coil is connected to the second terminal of the capacitor C1, and a second terminal of the primary coil is connected to the ground source. A first terminal of the secondary coil is connected to a HOT terminal of the discharge lamp CCFL1, and a second terminal of the secondary coil is connected to a HOT terminal of the discharge lamp CCFL2. The transformer TX boosts the square wave voltage generated by the switching circuit unit 110.

The capacitor Ca is connected between the first terminal of the secondary coil and the ground source, and the capacitor Cb is connected between the second terminal of the secondary coil and the ground source. At this time, the square wave voltage that is boosted is converted into a voltage of a sine wave while a resonance is generated by the capacitors Ca and Cb and the secondary coil of the transformer TX. The voltage of the sine wave is supplied as an output voltage of the inverter 100, that is, the driving voltage of the discharge lamps CCFL1 and CCFL2. The switching circuit unit 110 described in relation to FIG. 1 is but one embodiment, and other embodiments may include different switching circuit units.

The feedback supply unit 120 includes resistors Ra and Rb, and diodes Da and Db. The resistor Ra is connected between a COLD terminal of the discharge lamp CCFL1 and the ground source, and the resistor Rb is connected between a COLD terminal of the discharge lamp CCFL2 and the ground source. An anode of the diode Da is connected to the COLD terminal of the discharge lamp CCFL1 and an anode of the diode Db is connected to COLD terminal of the discharge lamp CCFL2, and cathodes of the diodes Da and Db is connected to a feedback terminal FB of the inverter driver 200. Thus, the feedback supply unit 120 feedbacks a voltage corresponding to a current flow to the discharge lamps CCFL1 and CCFL2 to the inverter driver 200. Hereinafter, a voltage that becomes feedback to the inverter driver 200 will be defined as a feedback voltage $V_{FB}$.

The inverter driver 200 has an error compensation terminal CMP and a feedback terminal FB, and outputs the control signals $S_{M1}$ and $S_{M2}$ to the gates of the transistors M1 and M2 when the DC voltage Vcc is input. At this time, the inverter driver 200 receives the feedback voltage $V_{FB}$ corresponding to the current flow to the discharge lamps CCFL1 and CCFL2 through the feedback terminal FB, and charges and discharges the capacitor Ccmp that is connected to the error compensation terminal CMP using the feedback voltage.

In addition, the inverter driver 200 controls the output voltage of the inverter 100 by controlling a duty ratio of the control signals $S_{M1}$ and $S_{M2}$ using a voltage of the capacitor Ccmp.

The discharge lamps CCFL1 and CCFL2 are turned on by receiving the output voltage of the inverter 100.

Next, the inverter driver according to the exemplary embodiment of the present invention will be described in detail with reference to FIG. 2.

FIG. 2 is drawing showing an inverter driver shown in FIG. 1.

Referring to FIG. 2, the inverter driver 200 includes an amplifier 210, comparators 220a and 220b, a NOR element 230, an SR latch 240, a D flip-flop 250, AND elements 260a, 260b, and 260c, and a soft start unit 270.

The amplifier 210 has an inverting terminal (−), a non-inverting terminal (+), and an output terminal. The feedback voltage $V_{FB}$ is input to the inverting terminal (−), a reference voltage Vref is input to the non-inverting terminal (+), and the output terminal is connected to the capacitor Ccmp. The amplifier 210 outputs a current corresponding to a voltage difference between the reference voltage Vref input to the non-inverting terminal (+) and the feedback voltage $V_{FB}$ input to the inverting terminal (−). A GM amplifier may be used as the amplifier 210. That is, when the voltage of the non-inverting terminals (+) of the amplifier 210 is denoted as V+ and the voltage of the inverting terminals (−) of the amplifier 210 is denoted as V−, an output current $I_{gm}$ of the amplifier 210 may be determined by Equation 1. Further, an output voltage Vcmp corresponding to the output current $I_{gm}$ is charged in the capacitor Ccmp.

$$I_{gm} = g_m(V_+ - V_-) \quad \text{(Equation 1)}$$

Here, $g_m$ is a gain of the amplifier 210.

The comparator 220a has an inverting terminal (−), a non-inverting terminal (+), and an output terminal. A control signal $S_{CT}$ is input to the non-inverting terminal (+), the voltage Vcmp of the capacitor Ccmp is input to inverting terminal (−), and the output terminal is connected to an input terminal of the NOR element 230. The comparator 220b has an inverting terminal (−), a non-inverting terminal (+), and an output terminal. A control signal $S_{BDIM\_T}$ is input to the inverting terminal (−), a control signal voltage $S_{BCT}$ is input to non-inverting terminal (+), and the output terminal is connected to input terminals of AND elements 260b and 260c. The comparators 220a and 220b compares a voltage input to the inverting terminal (−) and a voltage input to the non-inverting terminal (+), and then outputs pulse signals $S_{COM1}$ and $S_{COM2}$ according to the result of comparison. At this time, the control signal $S_{CT}$ may be a waveform having a maximum voltage (for example 2V) and a minimum voltage (for example 0.4V), and the waveform may be repeated as a predetermined frequency (for example 100 KHz) generated by an oscillator (not shown). A triangle wave, a sawtooth wave, or a ramp wave may be used as the control signal $S_{CT}$. The control signals $S_{BCT}$ and $S_{BDIM}$ are signals that are used for controlling brightness of the discharge lamps CCFL1 and CCFL2. The control signal $S_{BCT}$ may be a waveform having a maximum voltage (for example 2V) and a minimum voltage (for example 0.5V), and the waveform may be repeated as a predetermined frequency (for example 180-300 Hz) generated by an oscillator (not shown). A triangle wave, a sawtooth wave, or a ramp wave may be used as the control signal $S_{BCT}$. The frequency of the control signal $S_{BCT}$ may be set to be rather less than the frequency of the control signal $S_{CT}$. Furthermore, the control signal $S_{BDIM}$ is a signal that is controllable by a user. Thus, the brightness of the discharge lamps CCFL1 and CCFL2 may be controlled by controlling the voltage of the control signal $S_{BDIM}$ by the user.

The NOR element 230 has two input terminals and an output terminal. A clock signal $S_{CLK}$ having a predetermined period and the pulse signal $S_{COM1}$ of the comparator 220a are input to the two input terminals, respectively, and the output terminal is connected to a set terminal S of the SR latch 240. The NOR element 230 XOR-calculates signals input to the two input terminals, and outputs an XOR-calculated signal.

The SR latch 240, for example the SR latch 240, includes NOR gates, and has a set terminal S, a reset terminal R, and an output terminal Q1. An output signal $S_{NOR}$ is input to the set terminal S, the clock signal $S_{CLK}$ is input to the reset terminal R, and the output terminal Q1 is connected to the input terminal of the AND element 260a.

The D flip-flop 250 has a clock terminal CLK, an input terminal D, an output terminal Q2, and an inverting output terminal /Q2. The clock signal $S_{CLK}$ is input to the clock terminal CLK, the input terminal D is connected to the inverting output terminal /Q2, the inverting output terminal /Q2 is connected to an other input terminal of the AND element 260b, and the output terminal Q2 is connected to an other input terminal of the AND element 260c. The D flip-flop 250 of which the input terminal D is connected to the inverting output terminal /Q2 may operate like a T flip-flop. That is, the D flip-flop 250 inverts an output state when the clock signal $S_{CLK}$ becomes a high level, outputs an inverted signal through the output terminal Q2, and outputs an inverted signal output from the output terminal Q2 through the inverting output terminal /Q2.

The AND element 260a has two input terminals and an output terminal, and the AND elements 260b and 260c have three input terminals and an output terminal. The output signal $S_{Q1}$ of the SR latch 240 and the output signal $S_{NOR}$ of the NOR element 230 are input to the two input terminals of the AND element 260a, respectively, and the output terminal is connected to another input terminal of the AND elements 260b and 260c. The AND element 260a AND-calculates signals input to the two input terminals, and outputs an AND-calculated signal. In addition, the output signal $S_{/Q2}$ of the D flip-flop 260, the output signal $S_{COM2}$ of the comparator 220b, and output signal $S_{AND}$ of the AND element 260a are input to the three input terminals of the AND element 260b. The output signal $S_{AND}$ of the AND element 260a, the output signal $S_{COM2}$ of the comparator 220b, and the output signal $S_{Q2}$ of the D flip-flop 250 are input to the three input terminals of the AND element 260c. The output terminal of the AND 260b is connected to the gate of the transistor M1, and the output terminal of the AND 260c is connected to the gate of the transistor M2. The AND elements 260b and 260c AND-calculate signals input to the three input terminals, and output an AND-calculated signal. At this time, the output signals of the AND elements 260b and 260c become the control signal $S_{M1}$ and $S_{M2}$.

The soft start unit 270 controls to gradually increase the output voltage of the inverter 100 in the soft start period after a power source is supplied to the inverter driver 200 by gradually increasing the voltage Vcmp of the capacitor Ccmp using the control signal $S_{BCT}$ during the soft start period. That is, according to the exemplary embodiment of the present invention, the control signal $S_{BCT}$ is used as soft start signal during the soft start period.

Next, an operation of the inverter driver during a normal driving period after the soft start period will be described in detail with reference to FIG. 3.

Figure 3:
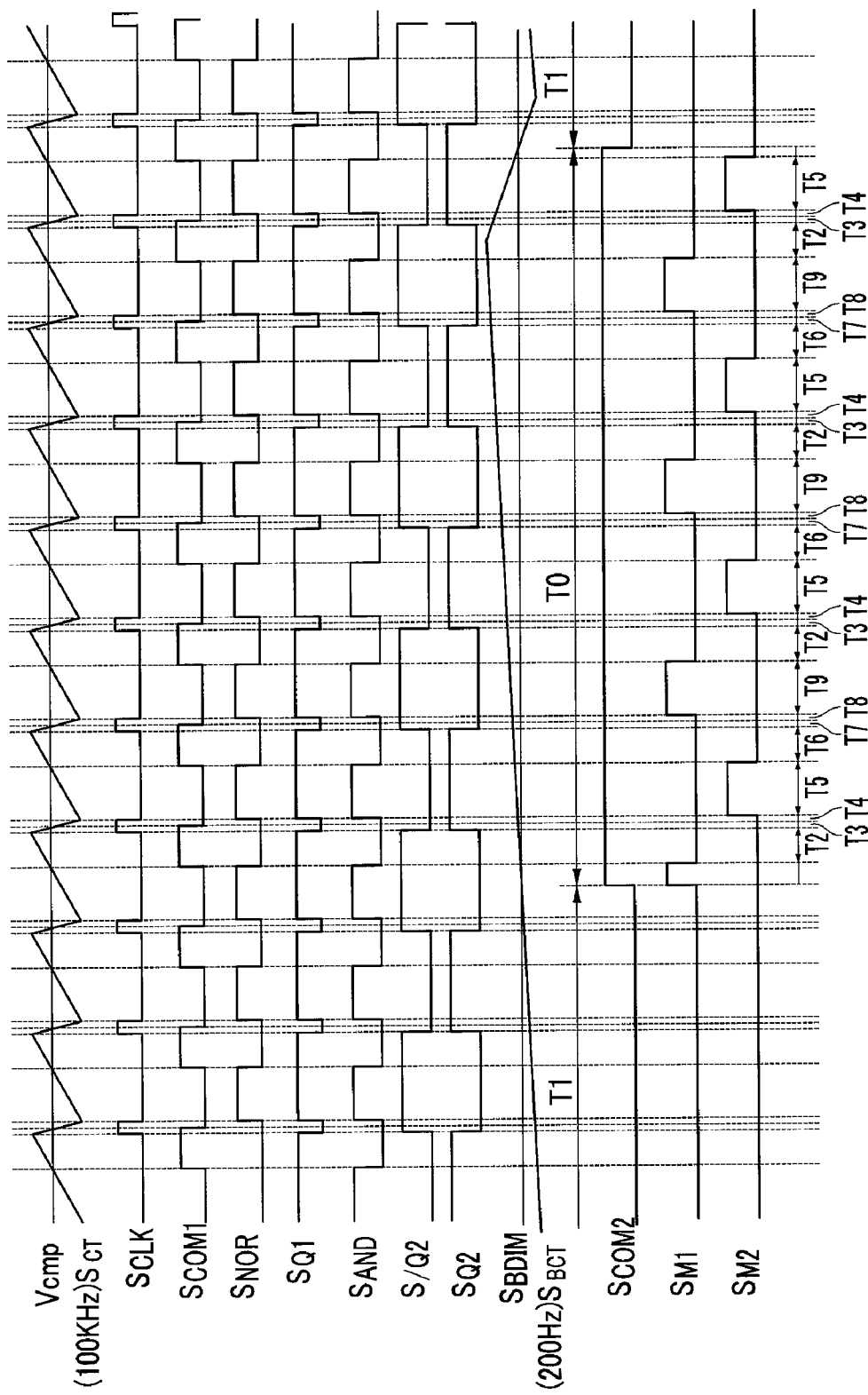
FIG. 3 is a drawing showing timing in a normal driving period of the inverter driver according to the exemplary embodiment of the present invention.

FIG. 3 is a drawing showing timing in a normal driving period of the inverter driver according to the exemplary embodiment of the present invention.

Since the output voltage of the inverter 100 is constant during a normal driving period, it is assumed in FIG. 3 that the voltage Vcmp of the capacitor Ccmp is a voltage between a maximum voltage (for example 2V) and a minimum voltage (for example 0.4) of the control signal $S_{CT}$ having a frequency of 100 KHz.

Referring to FIG. 3, the comparator 220b compares a voltage of the control signal $S_{BDIM}$ input to the inverting terminal (−) and a voltage of the control signal $S_{BCT}$ input to the non-inverting terminal (+), outputs the pulse signal $S_{COM2}$ having a high level during a period T0 in which the voltage of the control signal $S_{BCT}$ is more than the voltage of the control signal $S_{BDIM}$, and outputs the pulse signal $S_{COM2}$ having a low level during a period T1 in which the voltage of the control signal $S_{BCT}$ is lower than the voltage of the control signal $S_{BDIM}$. At this time, since the pulse signal $S_{COM2}$ of the comparator 220b is be input to the input terminal of the AND elements 260b and 260c, the AND elements 260b and 260c may output the control signals $S_{M1}$ and $S_{M2}$ having the low level when the pulse signal $S_{COM2}$ becomes the low level. That is, the transistors M1 and M2 are turned off during the period T1.

The comparator 220a compares the voltage Vcmp of the capacitor Ccmp input to the inverting terminal (−) and the voltage of the control signal $S_{CT}$ input to the non-inverting terminal (+), may output the pulse signal $S_{COM1}$ having a high level during periods T2, T3, T6, and T7 in which the voltage of the control signal $S_{CT}$ is more than the voltage Vcmp of the capacitor Ccmp, and may output the pulse signal $S_{COM1}$ having a low level during periods T4, T5, T8, and T9 in which the voltage of the control signal $S_{CT}$ is lower than the voltage Vcmp of the capacitor Ccmp.

Subsequently, the NOR element 230 may output a signal $S_{NOR}$ having a high level during periods T5 and T9 in which all the output signal $S_{COM1}$ of the comparator 220a and the clock signal $S_{CLK}$ become the low level, and may output a signal $S_{NOR}$ having a low level during remaining periods T2 to T4 and T6 to T8.

Since the clock signal $S_{CLK}$ input to the reset terminal R of the SR latch 240 becomes the low level during the periods T5 and T9 in which the output signal $S_{NOR}$ of the NOR element 230 becomes the high level, the SR latch 240 may output a signal $S_{Q1}$ having a high level during the periods T5 and T9. Further, since the output signal $S_{NOR}$ of the NOR element 230 and the clock signal $S_{CLK}$ become the low level during the periods T6 and T2 being consecutive to the periods T5 and T9, respectively, the SR latch 240 maintains the signal $S_{Q1}$ of the periods T5 and T9. Since the output signal $S_{NOR}$ of the NOR element 230 input to the reset terminal R of the SR latch 240 becomes the low level during the periods T3, T4, T7, and T8 in which the clock signal $S_{CLK}$ input to the reset terminal R becomes the high level, the SR latch 240 may output the signal $S_{Q1}$ having a low level in the periods T3, T4, T7, and T8. That is, the output signal $S_{Q1}$ of the SR latch 240 becomes the high level during the periods T3, T4, T7, and T8 in which the clock signal $S_{CLK}$ becomes the low level, and the output signal $S_{Q1}$ of the SR latch 240 becomes the low level during the periods T5, T6, T9, and T2 in which the clock signal $S_{CLK}$ becomes the high level.

Subsequently, since the AND element 260a AND-calculates the output signal $S_{Q1}$ of the SR latch 240 and the output signal $S_{NOR}$ of the NOR element 230 and output an AND-calculated signal, the AND element 260a may output the signal $S_{AND}$ having the high level during the periods T5 and T9 in which the output signal $S_{Q1}$ of the SR latch 240 and the output signal $S_{NOR}$ of the NOR element 230 become the high level, and may output the signal $S_{AND}$ having the low level during the remaining periods T2 to T4 and T6 to T8. Meanwhile, since the output signal $S_{AND}$ of the AND element 260a is the same as the output signal $S_{NOR}$ of the NOR element 230, the SR latch 240 and the AND element 260a may be omitted.

Since the D flip-flop 250 inverts an output state when the clock signal $S_{CLK}$ becomes a high level, may output an inverted signal through the output terminal Q2, and may output an inverted signal output from the output terminal Q2 through the inverting output terminal/Q2, during a period T3 to T6 from when the clock signal $S_{CLK}$ becomes the high level to when the clock signal $S_{CLK}$ next becomes the high level, the D flip-flop 250 may output the signal $S_{/Q2}$ having the low level through the inverting output terminal/Q2 and may output the signal $S_{/Q2}$ having the high level through the output terminal Q2. Next, during periods T7 to T9 and T2, from when the clock signal $S_{CLK}$ again becomes the high level to when the clock signal $S_{CK}$ next becomes the high level, the D flip-flop 250 inverts the previous output state and may output signal $S_{/Q2}$ having the high level through the inverting output terminal/Q2 and may output the signal $S_{/Q2}$ having the low level through the output terminal Q2.

Then, the AND element 260b may output the control signal $S_{M1}$ having a high level during a period T9 in which the pulse signal $S_{COM2}$ of the comparator 220b, the output signal $S_{/Q2}$ of the D flip-flop 250, and the output signal $S_{AND}$ of the AND element 260a become the high level, and may output the control signal $S_{M1}$ having a low level during a remaining period T2 to T8. Further, the AND element 260c may output the control signal $S_{M2}$ having a high level during a period T5 in which the pulse signal $S_{COM2}$ of the comparator 220b, the output signal $S_{Q2}$ of the D flip-flop 250, and the output signal $S_{AND}$ of the AND element 260a become the high level, and may output the control signal $S_{M2}$ having a low level during remaining periods T2 to T4 and T6 to T9. That is, the transistor M1 is turned on during the period T9 and the transistor M2 is turned on during the period T5. Thus, the output voltage of the inverter 100 may be determined while the operation for turning on and turning off the transistors M1 and M2 is repeated a predetermined number of times during the period T0.

In detail, the periods T2, T3, T6, and T7 having the high level in the pulse signal $S_{COM1}$ of the comparator 220a becomes longer, and the periods T4, T5, T8, and T9 having the low level in the pulse signal $S_{COM1}$ of the comparator 220a becomes shorter, when the voltage Vcmp of the capacitor Ccmp becomes lower. Accordingly, the periods T5 and T9 having the high level in the output signal ($S_{NOR}$) of the NOR element 230 become shorter, and the periods T2-T4 and T6-T8 having the low level in the output signal ($S_{NOR}$) of the NOR element 230 become longer. Further, since the periods T5 and T9 become shorter, the periods T3, T4, T7, and T8 having the high level in the output signal $S_{Q1}$ of the SR latch 240 become shorter, and the periods T5, T6, T9, and T2 having the low level in the output signal $S_{Q1}$ of the SR latch 240 become longer. In addition, periods T5 and T9 in which the output signal $S_{AND}$ of the AND element 260a has the high level become shorter, and periods T2 to T4 and T6 to T8 in which the output signal $S_{AND}$ of the AND element 260a has the low level become longer. Finally, a period in which the control signals $S_{M1}$ and $S_{M2}$ corresponding to the output signal of the AND elements 260b and 260c have a high level becomes shorter, and a period in which the control signals $S_{M1}$ and $S_{M2}$ have a low level becomes longer. Since the time during which the transistors M1 and M2 are turned on becomes shorter when the period in which the control signals $S_{M1}$ and $S_{M2}$ have the high level becomes shorter, the output voltage of the inverter 100 becomes lower. On the contrary, since a period in which the control signals $S_{M1}$ and $S_{M2}$ corresponding to the output signal of the AND elements 260b and 260c have a high level becomes longer, and a period which the control signals $S_{M1}$ and $S_{M2}$ have a low level becomes shorter, the output voltage of the inverter 100 becomes higher. That is, the duty ratio of the control signals $S_{M1}$ and $S_{M2}$ may be determined according to the voltage (Vcmp) of the capacitor (Ccmp), and the output voltage of the inverter 100 may be determined according to the duty ratio of the control signals $S_{M1}$ and $S_{M2}$.

Next, an operation of the inverter driver during the soft start period will be described in detail with reference to FIGS. 4 to 6.

Figure 4:
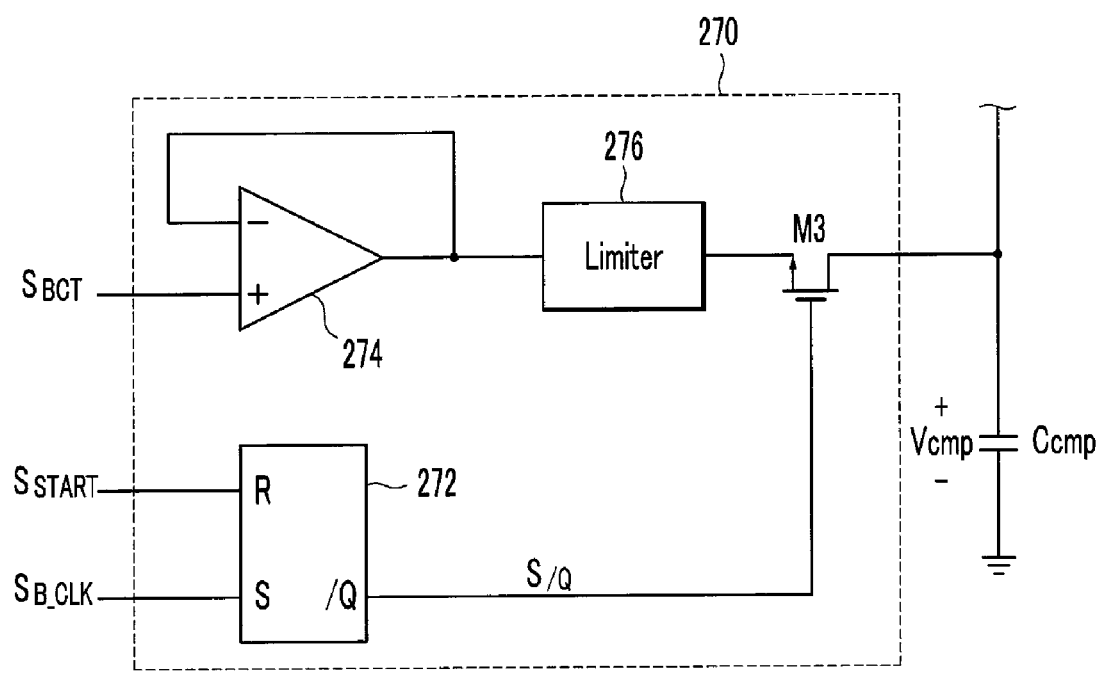
FIG. 4 is a drawing showing a soft start unit according to the exemplary embodiment of the present invention.
Figure 5:
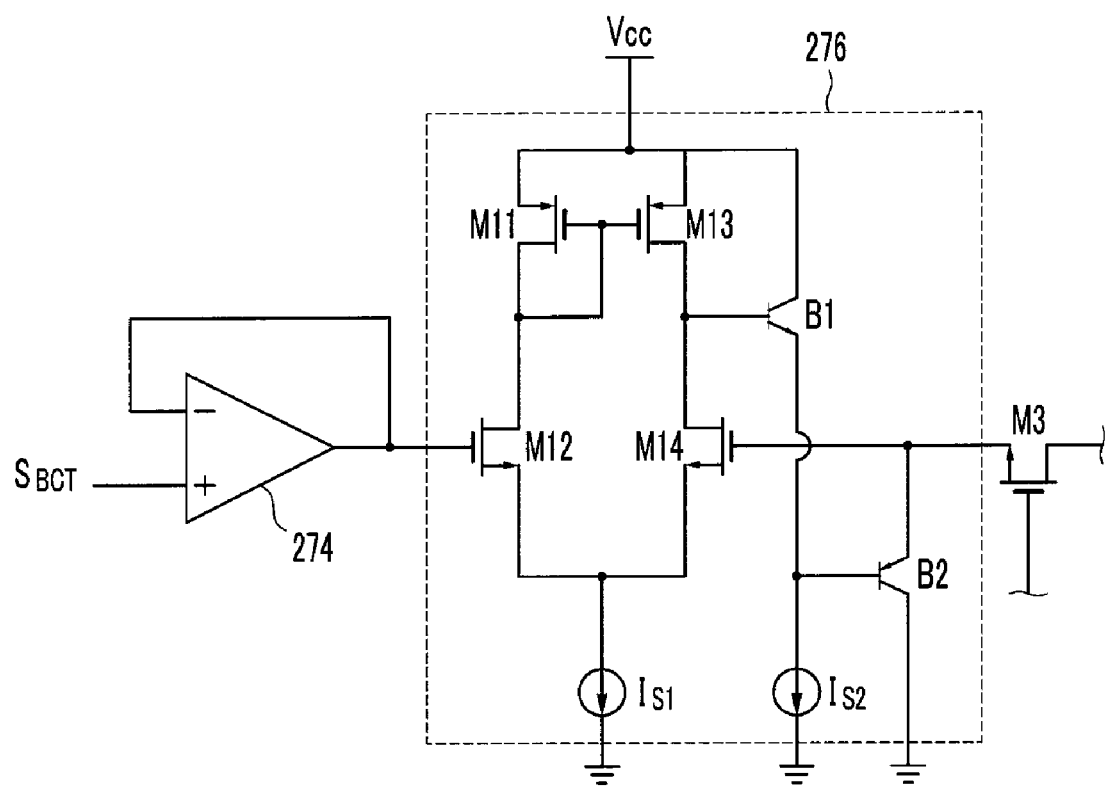
FIG. 5 is a drawing showing a circuit of a limiter shown in FIG. 4.

FIG. 4 is a drawing showing a soft start unit according to the exemplary embodiment of the present invention, and FIG. 5 is a drawing showing a circuit of a limiter shown in FIG. 4.

Referring to FIG. 4, the soft start unit 270 includes an SR latch 272, a transistor M3, a voltage follower 274, and limiter 276.

The SR latch 272 has a set terminal S, a reset terminal R, and an inverting output terminal/Q. A clock signal $S_{B\_CLK}$ having a predetermined period is input to the set terminal S, a soft start signal $S_{START}$ is input to the reset terminal R, and inverting output terminal IQ is connected to a gate of the transistor M3. At this time, the clock signal $S_{B\_CLK}$ is set to be high level while the voltage of the control signal $S_{BCT}$ is decreased, and is set to be low level while the voltage of the control signal $S_{BCT}$ is increased. Further, the clock signal $S_{B\_CLK}$ may be set different from this. Such SR latch 272 may output a signal $S_{/Q}$ having a high level through the inverting output terminal/Q in response to the soft start signal $S_{START}$ input to the reset terminal R during the soft start period.

A gate of the transistor M3 is connected to the inverting output terminal /Q of the SR latch 272, a drain of the transistor M3 is connected to the capacitor Ccmp, and a source of the transistor M3 is connected to an output terminal of the limiter 276. The transistor M3 is turned on in response to the output signal $S_{/Q}$ having the high level of the SR latch 272 during the soft start period, and accordingly, the output terminal of the limiter 276 is connected to the capacitor Ccmp. Meanwhile, in FIG. 4, the transistor M3 is illustrated as an n-channel field effect transistor, and particularly an n-channel metal oxide semiconductor (NMOS) transistor. However, other switches that can perform a similar function may be used for the transistor M3.

The voltage follower 274 has an inverting terminal (−), a non-inverting terminal (+), and an output terminal. The voltage follower 274 is formed as an operational amplifier of which the inverting terminal (−) is connected to the output terminal and the control signal ($S_{BCT}$) is input to the non-inverting terminal (+). The voltage follower 274 outputs the control signal $S_{BCT}$ input to the non-inverting terminal (+) to an input terminal of the limiter 276.

The limiter 276 is connected between the voltage follower 274 and the source of the transistor M3, and limits the voltage Vcmp of the capacitor Ccmp to the voltage of the control signal $S_{BCT}$ output from the voltage follower 274 when the transistor M3 is turned on. That is, the voltage Vcmp of the capacitor Ccmp may be determined by the voltage of the control signal $S_{BCT}$ during the soft start period.

Referring to FIG. 5, the limiter 276 includes transistors M11 to M14, B1, and B2, and current sources $I_{S1}$ and $I_{S2}$. In FIG. 5, the transistors M11 and M13 are illustrated as p-channel field effect transistors, and particularly p-channel metal oxide semiconductor (PMOS) transistors, while the transistors M12 and M14 are illustrated as n-channel field effect transistors, and particularly n-channel metal oxide semiconductor (NMOS) transistors. Furthermore, in FIG. 5, the transistor B1 is illustrated as a bi-polar junction transistor of an npn type, and the transistor B2 is illustrated as a bi-polar junction transistor of a pnp type. However, other switches that can perform similar functions may be used for the transistors M11 to M14, B1, and B2.

The transistors M11 to M14 are connected with a cascode current mirror type. More specifically, a source of the transistor M11 connected with a diode type is connected to the power source for supplying the DC voltage Vcc, a drain of the transistor M11 is connected to a drain of the transistor M12, and a gate of the transistor M11 is connected to a gate of the transistor M13. A source of the transistor M13 is connected to the power source for supplying the DC voltage Vcc, and a drain of the transistor M13 is connected to a drain of the transistor M14. The current source $I_{S1}$ is connected between sources of the transistors M12 and M14 and the ground source, a gate of the transistor M12 is connected to the output terminal of the voltage follower 274, and a gate of the transistor M14 is connected to the source of the transistor M3. At this time, the gate of the transistor M12 becomes the input terminal of the limiter 276, and the gate of the transistor M14 becomes the output terminal of the limiter 276.

In addition, a base of the transistor B1 is connected to the drain of the transistor M13, a collector of the transistor B1 is connected to the power source for supplying the DC voltage Vcc, and an emitter of the transistor B1 is connected to a base of the transistor B2. An emitter of the transistor B2 is connected to the source of the transistor M3, and a collector of the transistor B2 is connected to the ground source. The current source $I_{S2}$ is connected between the emitter of the transistor B1 and the ground source. At this time, the transistors B1 and B2, and the current source $I_{S2}$ may form a discharge path for discharging the voltage Vcmp of the capacitor Ccmp.

The operation of the limiter 276 will be described while the transistor M3 is turned on. Since the transistors M11 to M14 is connected with the cascode mirror type, a voltage of the gate of the transistor M14 may be determined according to a current flow to the transistors M13 and M14. If the sizes of the transistors M11-M14 are the same, since the current flow to the transistors M13 and M14 is the same as the current flow to the transistors M11 and M12, the gate voltage of the transistor M14 is the same as the gate voltage of the transistor M12. At this time, since the control signal $S_{BCT}$ is input to the gate of the transistor M12, the gate voltage of the transistor M14 may be determined by the voltage of the control signal $S_{BCT}$ input to the gate of the transistor M12. Here, the size of the transistor denotes a ratio between a channel width W of the transistor and a channel length L of the transistor.

When the current flows to the transistors M13 and M14, the current may flow to the base of the transistor B1. Accordingly, the transistor B1 may be turned on. Further, when the transistor B1 is turned on, the current may flow to the transistor B1, and accordingly, the transistor B2 may be turned on. In this way, when the current flows to the transistor M13 and M14, the transistor B2 maintains the state of being turned on. In addition, when the voltage Vcmp of the capacitor Ccmp becomes higher than the voltage of the control signal $S_{BCT}$, the capacitor Ccmp is discharged through a path of the transistor B2 and ground source by a voltage corresponding to a difference between the voltage of the voltage Vcmp of the capacitor Ccmp and the voltage of the control signal $S_{BCT}$. Finally, the voltage Vcmp of the capacitor Ccmp may be determined by the voltage of the control signal $S_{BCT}$.

Figure 6:
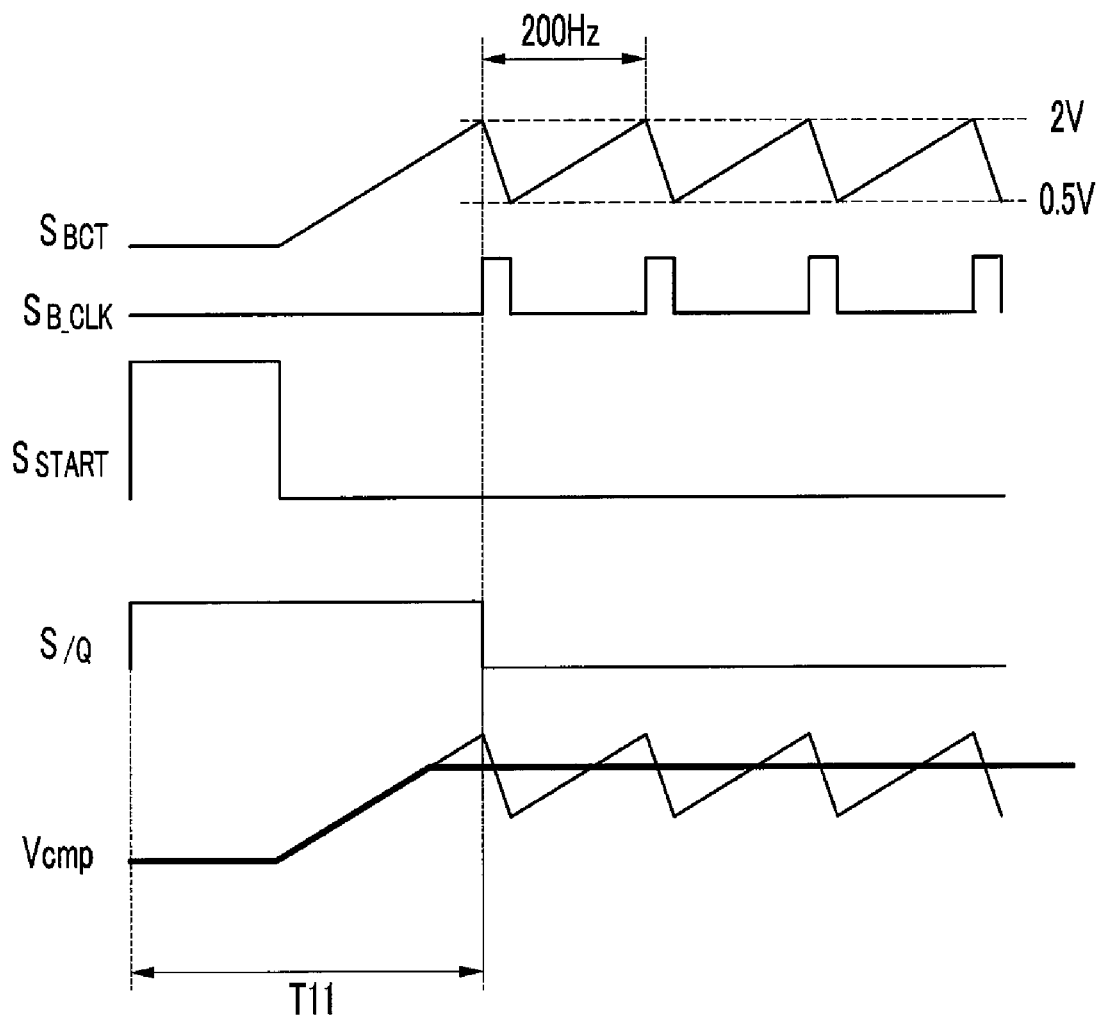
FIG. 6 is a drawing showing timing in a soft start period of the inverter driver according to the exemplary embodiment of the present invention.

FIG. 6 is a drawing showing timing in a soft start period of the inverter driver according to the exemplary embodiment of the present invention.

Referring to FIG. 6, when the power supply of the inverter driver 200 is turned on, the soft start signal $S_{START}$ is input to the reset terminal R of the SR latch 272, and the clock signal $S_{B\_CLK}$ is input to set terminal S of the SR latch 272. At this time, since the clock signal $S_{B\_CLK}$ becomes the low level when the soft start signal $S_{START}$ becomes the high level, the SR latch 272 may output the signal $S_{/Q}$ having the high level through the inverting output terminal/Q to the gate of the transistor M3. Though the soft start signal $S_{START}$ becomes the low level, since the clock signal $S_{B\_CLK}$ becomes the low level as well, the SR latch 272 may output the signal $S_{/Q}$ having the high level through the inverting output terminal/Q to the gate of the transistor M3.

That is, the SR latch 272 may output the signal $S_{/Q}$ having the high level to the gate of the transistor M3 during a period from after the soft start signal $S_{START}$ becomes the high level to before the clock signal $S_{B\_CLK}$ becomes the high level, that is, the soft start period T11.

Then, the transistor M3 is turned on, and the output terminal of the limiter 276 is connected to the capacitor Ccmp by turning on the transistor M3 during the soft start period T11. Accordingly, the voltage Vcmp of the capacitor Ccmp may be determined by the control signal $S_{BCT}$ during the soft start period T11. That is, the voltage Vcmp of the capacitor Ccmp may be determined as voltage of the control signal $S_{ECT}$ to before the feedback voltage $V_{FB}$ is the same as the reference voltage Vref in the soft start period T11. Further, since the output current of the amplifier 210 becomes 0 A when the feedback voltage $V_{FB}$ is the same as the reference voltage Vref, the capacitor Ccmp may maintain a voltage at a point in time which the feedback voltage $V_{FB}$ is the same as the reference voltage Vref.

In this way, since the voltage Vcmp of the capacitor Ccmp may be gradually increased by the control signal $S_{ECT}$ during the soft start period, the duty ratio of the control signals $S_{M1}$ and $S_{M2}$ may be gradually increased. Accordingly, the output voltage of the inverter 100 may be gradually increased.

That is, the inverter driver 200 according to the exemplary embodiment of the present invention may implement a simple soft start function by gradually increasing the voltage using the control signal $S_{BCT}$ without a digital-analog converter during the soft start period.

Further, the load driver 10 according to the exemplary embodiment of the present invention may be applied to a load other than the discharge lamps CCFL1 and CCFL2.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A load driver for driving a load, the load driver comprising:
   an inverter, configured to convert an input voltage into a driving voltage of the load using at least one first switch for switching according to a duty ratio;
   a capacitor, configured to be charged and discharged by a current corresponding to a difference between a feedback voltage corresponding to a current flow to the load and a reference voltage; and
   an inverter driver, configured to control the duty ratio using a first control signal having a waveform that is repeated with a first frequency and a voltage of the capacitor, and to set the voltage of the capacitor as a voltage corresponding to the first control signal during a soft start period;
   wherein the inverter driver comprises: a second switch having a first terminal connected to a non-grounded terminal of the capacitor; a logic device, configured to turn on the second switch in response to a soft start signal during the soft start period; and a limiter connected to a second terminal of the second switch, and configured to set the voltage of the capacitor as a voltage corresponding to the first control signal when the second switch is turned on.

2. The load driver of claim 1, wherein the inverter driver further comprises a voltage follower having an input terminal and an output terminal, and configured to receive the first control signal at the input terminal and to output the first control signal at the output terminal.

3. The load driver of claim 1, wherein the logic device comprises a latch, configured to set an output voltage in response to the soft start signal, and then to maintain the output voltage during the soft start period, wherein the second switch is turned on in response to the output voltage.

4. The load driver of claim 1, wherein the inverter driver comprises:
   an amplifier, configured to output a current corresponding to the difference between the feedback voltage and the reference voltage;
   a first comparator, configured to output a first pulse signal according to comparison of an output voltage corresponding to the current and a voltage of a second control signal having a waveform that is repeated with a second frequency; and
   a second comparator configured to output a second pulse signal according to comparison of a voltage of the first control signal and a voltage of a third control signal controlled from the outside the inverter driver, wherein the inverter driver controls the duty ratio using the first and second pulse signals.

5. The load driver of claim 4, wherein the second frequency is higher than the first frequency.

6. The load driver of claim 2, wherein the limiter comprises a current mirror including an input terminal for receiving the first control signal and an output terminal for outputting a voltage corresponding to the first control signal to the second terminal of the second switch.

7. The load driver of claim 6, wherein the current mirror comprises:
   a current source;
   a third switch having a first terminal, a second terminal connected to the current source, and a control terminal connected to the input terminal;
   a fourth switch having a first terminal, a second terminal connected to the current source, and a control terminal connected to the output terminal;
   a fifth switch having a first terminal connected to a power source, a second terminal connected to the first terminal of the third switch, and a control terminal; and
   a sixth switch having a first terminal connected to the power source, a second terminal connected to the first terminal of the fourth switch, and a control terminal connected to the control terminal of the fifth switch.

8. The load driver of claim 6, wherein the limiter further comprises a discharge path connected to the second terminal of the second switch, and configured to discharge the capacitor according to a voltage of the output terminal of the current mirror when the second switch is turned on.

9. The load driver of claim 8, wherein the discharge path comprises:
   a current source;
   a third switch having a first terminal connected to a power source, and a second terminal connected to the current source; and
   a fourth switch having a first terminal connected to the second terminal of the second switch, a second terminal connected to a ground source, and a control terminal connected to the current source.

10. The load driver of claim 9, wherein the type of the third switch is opposite to the type of the fourth switch.

11. The load driver of claim 1, wherein:
    the inverter comprises:
    a switching circuit unit, configured to generate a square wave voltage from the input voltage and to output the generated square wave voltage using the at least one first switch; and
    a transformer having a primary coil connected to the switching circuit unit and a secondary coil connected to the load, and configured to convert the square wave voltage to the driving voltage.

12. An inverter driver, configured to drive an inverter to supply driving voltages to a load using at least one first switch for switching according to a duty ratio, the inverter driver comprising:

a first terminal connected to a capacitor;
an amplifier, configured to output a current corresponding to a difference between a feedback voltage corresponding to a current flow to the load and a reference voltage to the capacitor;
a first comparator, configured to output a first pulse signal according to comparison of a voltage of a first control signal having a waveform that is repeated with a first frequency and a voltage of a second control signal controlled from outside the inverter driver;
a second comparator, configured to output a second pulse signal according to comparison of a voltage of a third control signal having a waveform that is repeated with a second frequency and a voltage of the capacitor; and
a soft start unit, configured to set the voltage of the capacitor as the first control signal during a soft start period, wherein the duty ratio of the at least one first switch is determined by the first and second pulse signals.

13. The inverter driver of claim 12, wherein the first frequency is lower than the second frequency.

14. The inverter driver of claim 12, wherein the soft start unit comprises:
a second switch having a first terminal connected to the capacitor;
a logic device, configured to turn on the second switch in response to a soft start signal during the soft start period; and
a limiter connected to a second terminal of the second switch, and configured to set the voltage of the capacitor as a voltage corresponding to the first control signal when the second switch is turned on.

15. The inverter driver of claim 14, wherein the soft start unit further comprises a voltage follower having an input terminal and an output terminal, and configured to receive the first control signal at the input terminal and to output the first control signal at the output terminal to the limiter.

16. The inverter driver of claim 14, further comprising:
a current mirror including an input terminal for receiving the first control signal, and an output terminal for outputting a voltage corresponding to the first control signal to the second terminal of the second switch; and
a discharge path connected to the second terminal of the second switch, and configured to discharge the capacitor according to a voltage of the output terminal of the current mirror when the second switch is turned on.

17. A method of driving a load using a switching device for switching according to a duty ratio and a capacitor, the method comprising:
generating a first control signal having a waveform that is repeated with a first frequency;
generating a second control signal having a waveform that is repeated with a second frequency;
generating a first pulse signal using a voltage of the capacitor and a voltage of the second control signal;
generating a second pulse signal using the first control signal;
determining a duty ratio according to the first and second pulse signals;
setting the voltage of the capacitor as a voltage corresponding to the first control signal during a soft start period; and
charging and discharging the capacitor using a voltage that is determined by a current corresponding to a difference between a feedback voltage corresponding to a current flow to the load and a reference voltage during a normal driving period after the soft start period, wherein a voltage of the first control signal is gradually increased during the soft start period.

18. The method of claim 17, wherein the first frequency is lower than the second frequency.

19. The method of claim 17, wherein the setting comprises:
turning on the switch connected between the first control signal and the capacitor in response to a soft start signal during the soft start period.

20. The method of claim 17, wherein the generating the second pulse signal comprises:
generating the second pulse signal by comparison between the voltage of the first control signal and a third control signal controlled from outside the inverter.

* * * * *